United States Patent
Mukumoto

(10) Patent No.: US 7,668,285 B2
(45) Date of Patent: Feb. 23, 2010

(54) X-RAY COMPUTED TOMOGRAPHIC APPARATUS AND IMAGE PROCESSING APPARATUS

(75) Inventor: Go Mukumoto, Otawara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 60 days.

(21) Appl. No.: 11/057,234

(22) Filed: Feb. 15, 2005

(65) Prior Publication Data
US 2005/0180540 A1    Aug. 18, 2005

(30) Foreign Application Priority Data
Feb. 16, 2004    (JP)    ............... 2004-037577

(51) Int. Cl.
*A61B 6/00* (2006.01)
(52) U.S. Cl. ......................................................... 378/4
(58) Field of Classification Search ............... 378/4–20, 378/901
See application file for complete search history.

(56) References Cited

U.S. PATENT DOCUMENTS

| | | | | | |
|---|---|---|---|---|---|
| 4,835,688 | A | * | 5/1989 | Kimura ....................... | 345/424 |
| 5,099,846 | A | * | 3/1992 | Hardy ......................... | 600/407 |
| 5,371,778 | A | * | 12/1994 | Yanof et al. .................. | 378/4 |
| 5,734,384 | A | * | 3/1998 | Yanof et al. .................. | 345/424 |
| 5,800,352 | A | * | 9/1998 | Ferre et al. .................. | 600/407 |
| 5,825,908 | A | * | 10/1998 | Pieper et al. ................. | 382/131 |
| 6,023,494 | A | * | 2/2000 | Senzig et al. ................. | 378/4 |
| 6,083,162 | A | * | 7/2000 | Vining ........................ | 600/407 |
| 6,108,573 | A | * | 8/2000 | Debbins et al. ............. | 600/410 |
| 6,149,592 | A | * | 11/2000 | Yanof et al. ................. | 600/427 |
| 6,167,296 | A | * | 12/2000 | Shahidi ....................... | 600/427 |
| 6,196,715 | B1 | * | 3/2001 | Nambu et al. ............... | 378/197 |
| 6,266,453 | B1 | * | 7/2001 | Hibbard et al. ............. | 382/294 |
| 6,324,243 | B1 | * | 11/2001 | Edic et al. ....................... | 378/4 |
| 6,345,112 | B1 | * | 2/2002 | Summers et al. ............ | 382/128 |
| 6,574,304 | B1 | * | 6/2003 | Hsieh et al. .................. | 378/62 |
| 6,754,374 | B1 | * | 6/2004 | Miller et al. ................ | 382/128 |
| 6,757,417 | B2 | * | 6/2004 | Licato et al. ................ | 382/131 |
| 6,806,864 | B2 | * | 10/2004 | Rahn et al. .................. | 345/158 |
| 6,844,884 | B2 | * | 1/2005 | Balloni et al. ............... | 345/629 |
| 6,891,963 | B1 | * | 5/2005 | Goto et al. ................... | 382/131 |
| 7,068,837 | B2 | * | 6/2006 | Befu et al. ................... | 382/154 |

FOREIGN PATENT DOCUMENTS

JP    2001-137231    5/2001

* cited by examiner

*Primary Examiner*—Edward J Glick
*Assistant Examiner*—Alexander H Taningco
(74) *Attorney, Agent, or Firm*—Oblon, Spivak, McClelland, Maier & Neustadt, L.L.P.

(57) ABSTRACT

An X-ray computed tomographic apparatus comprises a scanner to scan in a three-dimensional region of a subject by X-rays, a storing unit to store projection data acquired by the scanning, a reconstruction processing unit to generate volume data which corresponds to a three-dimensional region, based on the stored projection data, an MPR processing unit to generate slice image data relating to three-direction slice planes from the volume data, a displaying unit to display the slice image data together with a graphic element representing a reconstruction range, an operating unit to operate the graphic element, and a reconstruction processing unit to reconstruct tomographic image data which corresponds to the reconstruction range represented by the graphic element, based on the stored projection data.

22 Claims, 8 Drawing Sheets

US 7,668,285 B2

X-RAY COMPUTED TOMOGRAPHIC APPARATUS AND IMAGE PROCESSING APPARATUS

CROSS-REFERENCE TO RELATED APPLICATIONS

This application is based upon and claims the benefit of priority from prior Japanese Patent Application No. 2004-037577, filed Feb. 16, 2004, the entire contents of which are incorporated herein by reference.

BACKGROUND OF THE INVENTION

1. Field of the Invention

The present invention relates to an X-ray computed tomographic apparatus and an image processing apparatus which generate tomographic image data based on projection data acquired by scanning a subject by means of X-rays.

2. Description of the Related Art

In recent years, in an X-ray computed tomographic apparatus, with advancement of practical use of volume scan (referred to as a cone beam scan) due to helical scan or multiply arrayed X-ray detectors, a wide range of data has been successfully acquired in a short time. In such a situation, unlike a conventional technique, instead of carrying out scanning in a scan range according to a reconstruction range which has been set in advance, it is believed that there will be an increasing demand for a technique for setting a reconstruction condition or a reconstruction range after scanning to reconstruct an image. Processing for reconstructing an image by setting the reconstruction condition or reconstruction range after scanning is referred to as batch reconstruction processing in order to discriminate processing for speedily reconstructing an image immediately after scanning the reconstruction condition or reconstruction range which has been set in advance. In the batch reconstruction processing, in order to set the reconstruction range, an axial image is displayed together with a scanogram, as shown in FIG. 8. The range in a body axis direction is specified on the scanogram, and the range in two directions orthogonal to the body axis is specified on the axial image.

The scanogram is a projection image, and moreover, is low in resolution, and thus, a morphological structure is hardly recognized. Thus, an axial image check is made in order to finally determine the range in the body axis direction. While switching axial images, namely, while moving a slice position of the axial image along the body axis, an operator checks the morphological structure in detail, and finally determines the range in the body axis direction. In this method, operability is very poor, and a large amount of tine interval is required to set the reconstruction range.

BRIEF SUMMARY OF THE INVENTION

It is an object of the present invention to improve operability of setting a reconstruction range for batch construction processing in an X-ray computed tomographic apparatus and an image processing apparatus.

According to a first aspect of the present invention, there is provided an X-ray computed tomographic apparatus, comprising: a scanning unit configured to perform scanning in a three-dimensional region of a subject by X-rays; a storing unit configured to store projection data acquired by the scanning; a volume data generating unit configured to generate volume data which corresponds to the three-dimensional region based on the stored projection data; a slice image data generating unit configured to generate slice image data relating to at least three-direction slice planes from the volume data; a displaying unit configured to display the slice image data together with a graphic element which represents a reconstruction range; an operating unit configured to operate the graphic element; and a reconstructing unit configured to reconstruct tomographic image data corresponding to the reconstruction range represented by the graphic element, based on the stored projection data.

According to a second aspect of the present invention, there is provided an X-ray computed tomographic apparatus, comprising: a scanning unit to perform scanning in a three-dimensional region of a subject by means of X-rays; a storing unit to store projection data acquired by the scanning; a displaying unit to display at least three-direction image data which corresponds to the three-dimensional region together with a graphic element representing a reconstruction range; an operating unit to operate the graphic element; and a reconstructing unit to reconstruct tomographic image data which corresponds to the reconstruction range represented by the graphic element, based on the stored projection data.

According to a third aspect of the present invention, there is provided an X-ray computed tomographic apparatus, comprising: a scanning unit to perform scanning in a three-dimensional region of a subject by means of X-rays; a storing unit to store projection data acquired by the scanning; a displaying unit to display a scanogram relating to the subject together with a graphic element representing a reconstruction range; an operating unit to operate the graphic element; and a reconstructing unit to reconstruct tomographic image data which corresponds to the reconstruction range represented by the graphic element, based on the stored projection data.

According to a fourth aspect of the present invention, there is provided an image processing apparatus comprising: a storing unit to store projection data relating to a three-dimensional region of a subject; a volume data generating unit to generate volume data which corresponds to the three-dimensional region, based on the stored projection data; a slice image data generating unit to generate slice image data relating to at least three-direction slice planes from the volume data; a displaying unit to display the slice image data together with a graphic element representing a reconstruction range; an operating unit to operate the graphic element; and a reconstructing unit to reconstruct tomographic image data which corresponds to the reconstruction range represented by the graphic element, based on the stored projection data.

According to a fifth aspect of the present invention, there is provided an image processing apparatus comprising: a storing unit to store projection data relating to a three-dimensional region of a subject; a displaying unit to display at least three-direction image data which corresponding to the three-dimensional region together with a graphic element representing a reconstruction range; an operating unit to operate the graphic element; and a reconstructing unit to reconstruct tomographic image data which corresponds to the reconstruction range represented by the graphic element, based on the stored projection data.

According to a sixth aspect of the present invention, there is provided an image processing apparatus comprising: a storing unit to store projection data relating to a three-dimensional region of a subject; a displaying unit to display a scanogram relating to the subject together with a graphic element representing a reconstruction range; an operating unit to operate the graphic element; and a reconstructing unit to reconstruct tomographic image data which corresponds to the reconstruction range represented by the graphic element, based on the stored projection data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, a description will be given with respect to a mode for carrying out an image processing apparatus and an X-ray computed tomographic apparatus including the same. As is well known, The X-ray computed tomographic apparatus includes various types, such as a rotate/rotate type in which a unit comprising the X-ray tube and the radiation detector rotates about the subject, and a stationary/rotate type in which a number of detection elements are aligned in a ring-shaped array and the X-ray tube alone rotates about the subject, and the invention is applicable to any type. Herein, the currently most popular rotate/rotate type will be described. In addition, the present invention can also be applied not only to a single-tube system equipped with one pair of an X-ray tube and a detecting system but also to a multi-tube system equipped with a plurality, for example, three pairs of X-ray tubes and detecting systems which have recently been developed for practical use. Hereinafter, a description will be given with respect to a single-tube system for the sake of convenience. Further, in order to reconstruct tomographic data for one slice, it is necessary to obtain projection data of about 360° for a full circle of the subject, and projection data of 180° plus a fan angle is needed in the half scan method. The invention is applicable to either reconstruction method. Here, a description will be given assuming that tomographic image for one slice is reconstructed from a set of the former general projection data for about 360°.

In addition, volume data is handled here. The volume data is defined as a data set representing a three-dimensional distribution of CT numbers which correspond to a three-dimensional region of the subject. In actuality, the volume data is expressed in a multi-slice format serving as a set encompassing a plurality of slices of tomographic images which serves as a set of a plurality of pixels having CT numbers or in a voxel format serving as a set of a plurality of voxels having CT numbers. A helical scan system or a cone beam scan system is employed as scan for obtaining the volume data. As is well known, the helical scan system is provided as a system of repeating data acquisition while X-ray tubes and X-ray detectors continuously rotate the periphery of the subject and a tabletop having the subject placed thereon moves along its rotary shaft there at a constant speed. The cone beam scan system is provided as a system of acquiring data in a three-dimensional region in a tabletop stop state by employing: an X-ray detector having arrayed therein a number of detecting elements in a slice direction (parallel to the rotary axis), for example, over a width of 30 cm, called plane detectors, two-dimensional arrayed detectors or multi-arrayed detectors; and cone beam X-ray tubes for generating conical X-rays.

Figure 1:
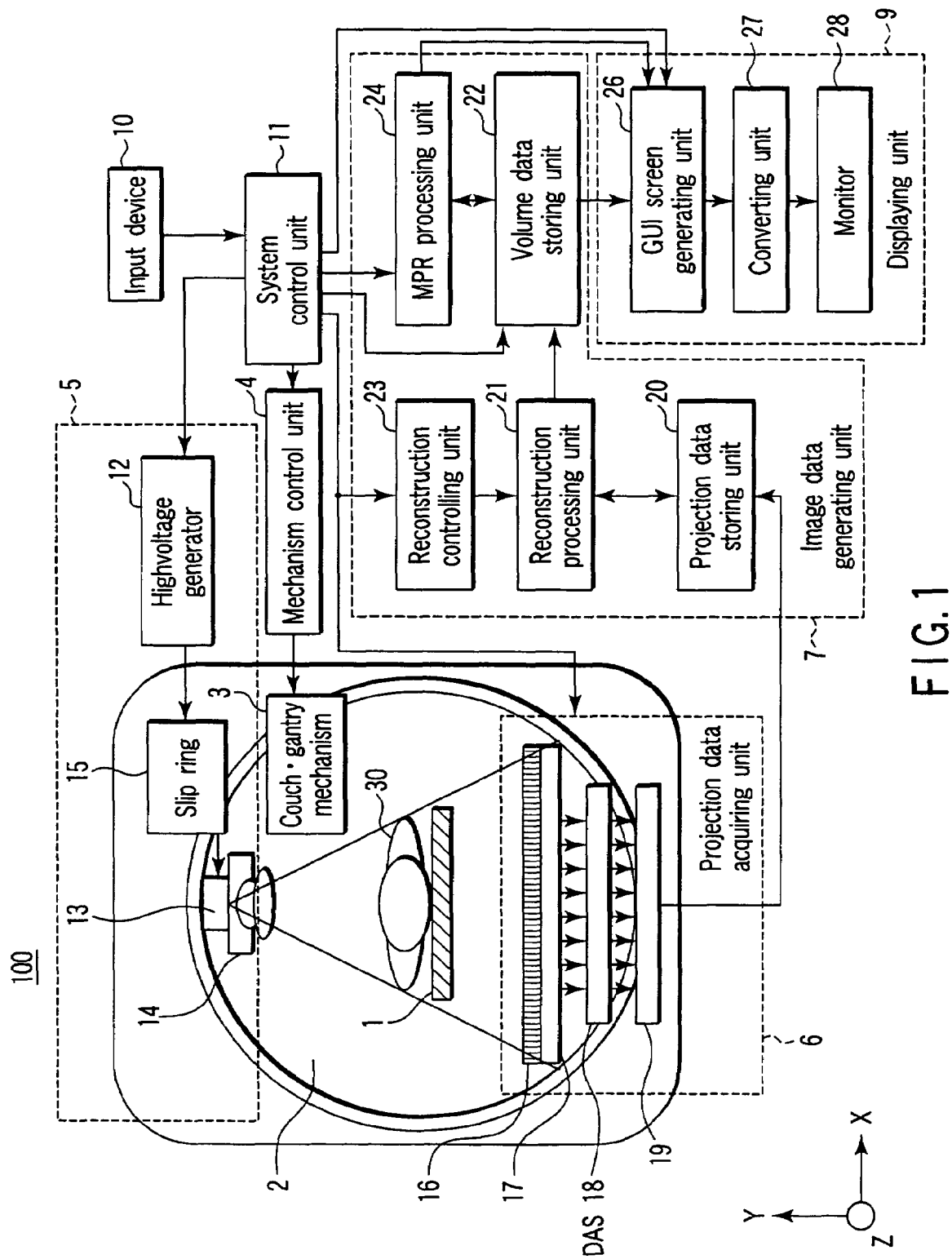
FIG. 1 is a diagram showing a configuration of an X-ray computed tomographic apparatus according to an embodiment of the present invention.

FIG. 1 is a block diagram depicting a configuration of an X-ray computed tomographic apparatus according to the present embodiment. A scan gantry 100 has a circular gantry rotating unit 2 rotatably maintained by a patient couch/gantry mechanism 3. Rotation of the gantry rotating unit 2 by the patent couch/gantry mechanism 3 is controlled by a mechanical control unit 4. The mechanical control unit 4 is under the control of a system control unit 11.

An X-ray tube 13 and an X-ray detector 16 are mounted on the gantry rotating unit 2 so as to be opposed to each other by sandwiching a rotation center axis. A subject 30 placed on a patient couch 1 is allocated in the vicinity of the rotation center axis. A high voltage is applied from a high voltage generator 12 to the X-ray tube 13 via a slip ring 15, and a filament current is supplied, thereby generating an X-ray. In order to reshape the X-ray in a predetermined conical shape, an X-ray collimator 14 is mounted on an X-ray radiation window of the X-ray tube 13. The X-ray tube 13 configures an X-ray generating unit 5 together with the high voltage generator 12, the slip ring 15, and the X-ray collimator 14.

The X-ray detector 16 has a plurality of detecting elements arranged in one-dimensional or two-dimensional manner for converting the X-rays having transmitted the subject 30 into a charge in number corresponding to its intensity. One or a predetermined number of detecting elements configure(s) one channel which has been electrically isolated. Here, for the sake of convenience, a description will be given assuming that one element configures one channel. A data acquisition system (DAS) 18 is connected to the X-ray detector 16 via switches 17. In the data acquisition system 18, there are provided on a channel by channel basis: an I-V converter for converting a current signal of the X-ray detector 16 into a voltage; an integrator for periodically integrating the voltage signal in synchronism with an X-ray exposure period; an amplifier for amplifying an output signal of the integrator; and an analog/digital converter for converting an output signal of the preamplifier into a digital signal. Data (projection data) outputted from the data acquisition system 18 is sent to an image data generating unit 7 via a non-contact type data transmitting unit 19 utilizing light or magnet. The X-ray detector 16 configures a projection data acquiring unit 6 together with the switches 17, the data acquisition system 18, and the data transmitting unit 19. A projection data acquisition operation of the projection data acquiring unit 6 is under the control of the system control unit 11.

The image data generating unit 7 has: a projection data storing unit 20 for storing the projection data outputted from the projection data acquiring unit 6; a reconstruction processing unit 21; a reconstruction processing control unit 23; a volume data storing unit 22; and an MPR processing unit 24. The reconstruction processing unit 21 are selectively equipped with a cone beam reconstruction technique, a multi-slice reconstruction technique, and a zooming reconstruction technique. As is well known, the cone beam reconstruction technique is provided as processing for applying reverse projection to an oblique ray according to a cone angle with respect to a voxel set. In addition, the zooming reconstruction technique is also provided as processing for reconstructing a high resolution image (image having high spatial resolution) by limiting a reconstruction range to a portion of the scan range.

The reconstruction processing unit 21 generates volume data under the control according to the reconstruction condition established by the reconstruction processing control unit 23 based on the projection data stored in the projection data storing unit 20. The volume data is generated by interpolating in a slice direction the tomographic image data on the typically reconstructed multi-slices. The reconstruction conditions include a reconstruction technique, a reconstruction range, a reconstruction function, a full reconstruction/half reconstruction, a reconstruction slice thickness, a viewing direction, the number of stacks, and the presence or absence of a filter. The reconstruction conditions are set via an input device 10, and are supplied from the system control unit 11 to the reconstruction processing control unit 23.

Volume data is stored in the volume data storing unit 22. The MPR processing unit 24 generates tomographic image data on an arbitrary slice by MPR processing (slice conversion processing) from the volume data stored in the volume data storing unit 22.

A GUI screen generating unit 26 is provided to generate a graphical user interface screen (GUI screen) including tomographic image data together with a variety of operating buttons according to a variety of steps such as a scan planning step and a reconstruction condition setting step of the batch reconstruction processing such as zooming reconstruction. The generated GUI screen is scan-converted by a converting unit 27, and the scan-converted screen contents are displayed on a monitor 28.

Figure 2:
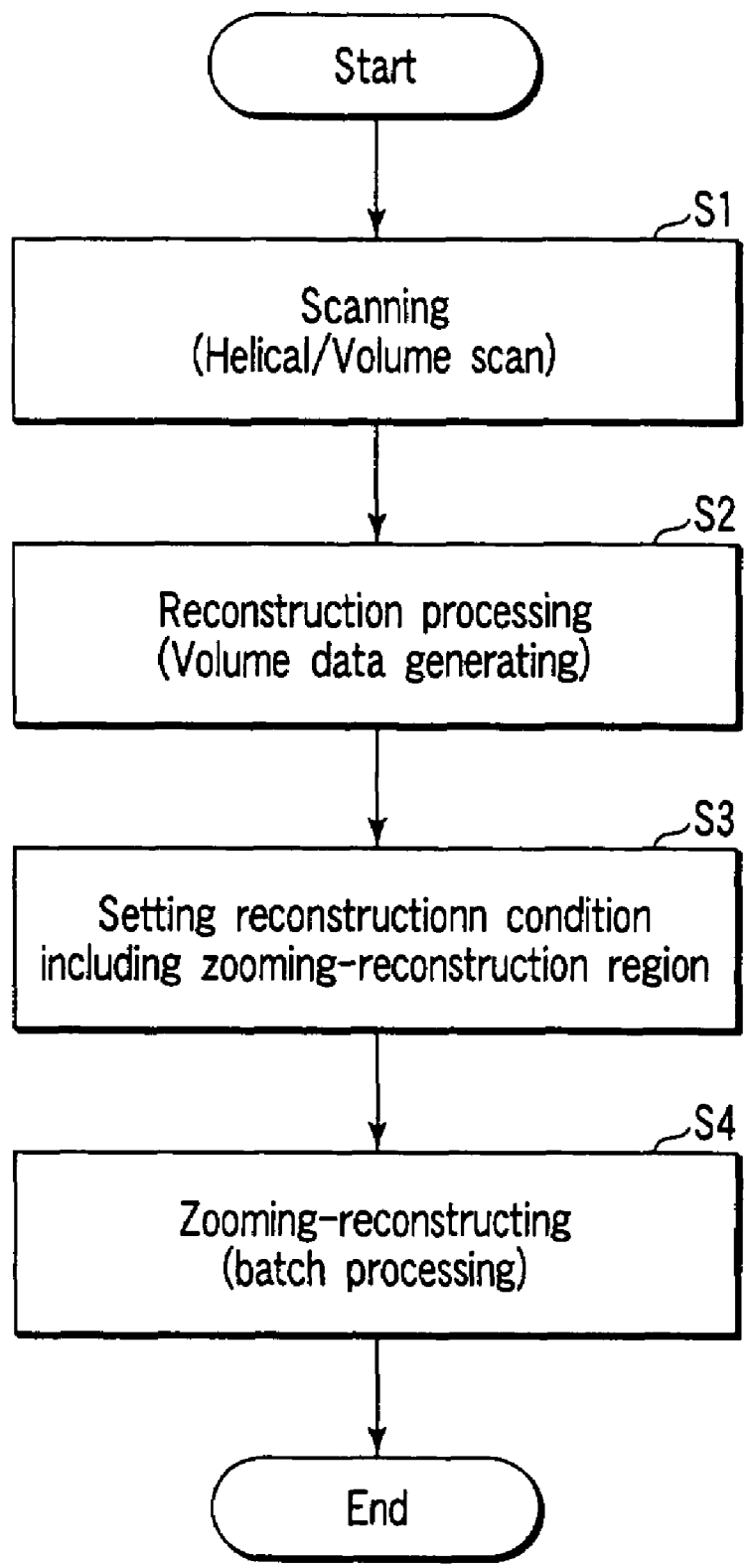
FIG. 2 is a flow chart showing a flow of processing from scanning to the completion of zooming reconstruction processing according to the embodiment.

As shown in FIG. 2, for the whole operating procedures according to the present embodiment, first, a three-dimensional region of the subject 30 is scanned by a helical scan system or a volume scan system (cone beam scan system) in accordance with the scan condition set during scan planning (S1). In this manner, a set of projection data relating to the three-dimensional region is acquired, and the acquired set of the data is stored in the projection data storing unit 20. After scanning has terminated, the volume data serving as a CT number distribution in the three-dimensional region is immediately reconstructed in accordance with the cone beam reconstruction technique or multi-slice reconstruction technique based on the stored set of the projection data (S2). The volume data is stored in the volume data storing unit 22. Typically, the volume data reconstruction condition is initially set according to a region to be imaged.

Following S2, for example, when zooming reconstruction processing is instructed to be executed as batch processing under a reconstruction condition which is different from the reconstruction condition for an immediate reconstruction processing set during scan planning, the system control unit 10 starts up an expert system for the zooming reconstruction processing. Under the expert system, a series of the flow of zooming reconstruction processing includes: a zooming reconstruction condition setting step (S3), a zooming reconstruction processing step (S4), and a step of displaying a zooming reconstructed tomographic image having a high resolution which are sequentially executed.

Figure 3:
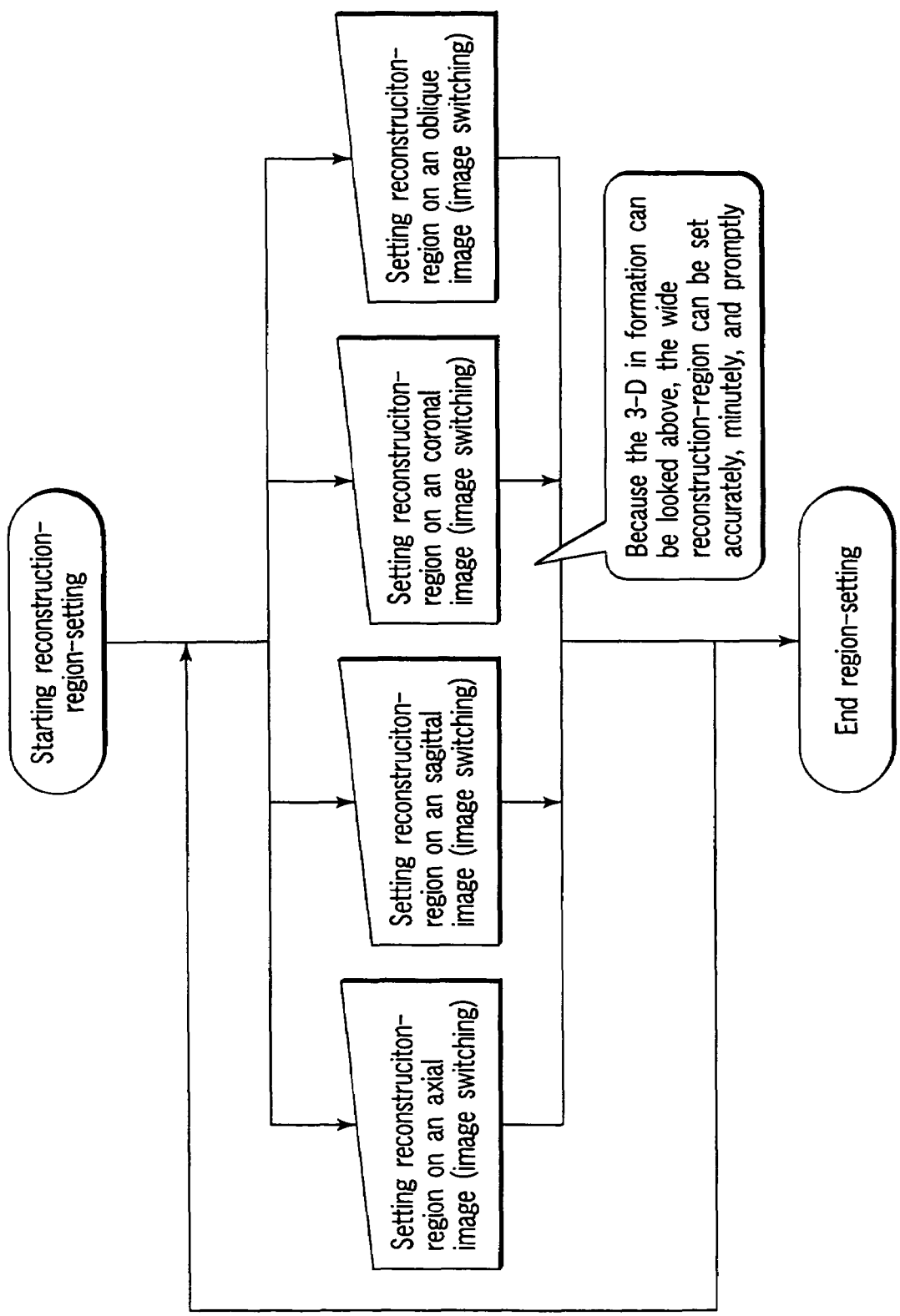
FIG. 3 is a chart showing an outline of processing in S3 of FIG. 2.

In this embodiment, as shown in FIG. 3, in order to set a reconstruction condition, for example, a zooming reconstruction range, orthogonal three-axis images such as an axial image, a sagittal image, and a coronal image; and a tilt image (oblique image) are generated and displayed as required. Moreover, so-called image switching for arbitrarily moving the slice position of each image can be carried out. In this manner, three-dimensional information can be easily seen so that a wide zooming reconstruction range can be set precisely, finely, and speedily.

Figure 4:
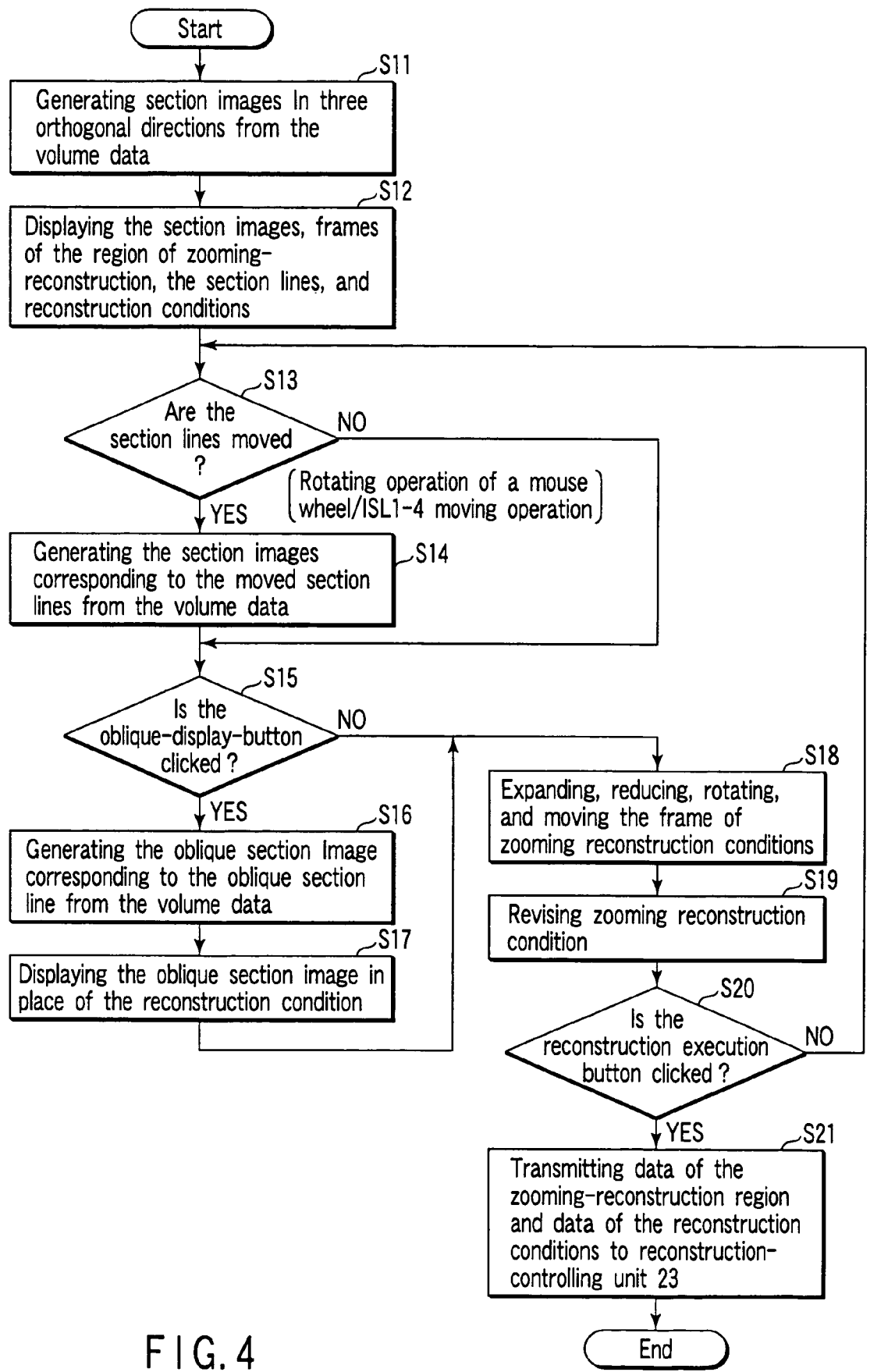
FIG. 4 is a flow chart showing a flow of processing in S3 of FIG. 2 in detail.

FIG. 4 shows processing procedures for setting a zooming reconstruction range in S3 of FIG. 2. When zooming reconstruction processing is requested as batch processing via the input device 10, the system control unit 11 instructs the MPR processing unit 24 to initially generate an axial image, a sagittal image, and a coronal image as three-direction slice images orthogonal to each other at the center of the three-dimensional region from the volume data which corresponds to the three-dimensional region of the subject 30. An image of a slice plane generated (reconstructed) from the volume data is referred to as a "slice image", and an image of a slice plane reconstructed from projection data is referred to as a "tomographic image" in order to easily discriminate both of them. In accordance with an instruction from the system control unit 11, the MPR processing unit 24 generates a slice image relating to a three-direction slice plane from the volume data (S1). The slice images relating to different three-direction slice planes are typically provided as an axial image, a sagittal image, and a coronal image which are orthogonal to each other at the center of the three-dimensional region. The slice images each have a 512×512 pixel size, for example.

Figure 5:
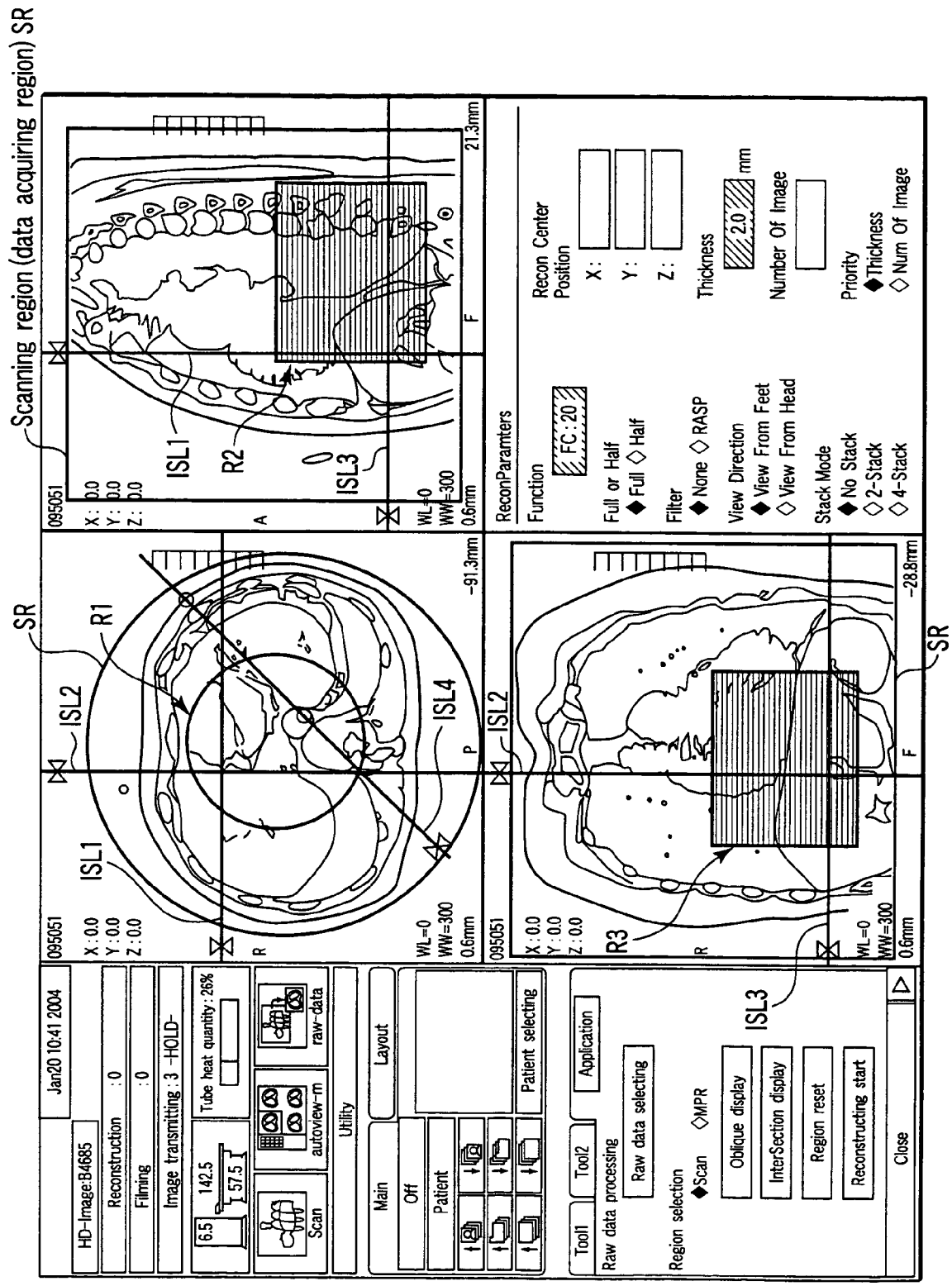
FIG. 5 is a view showing an example of a display screen in S12 of FIG. 4.
Figure 7:
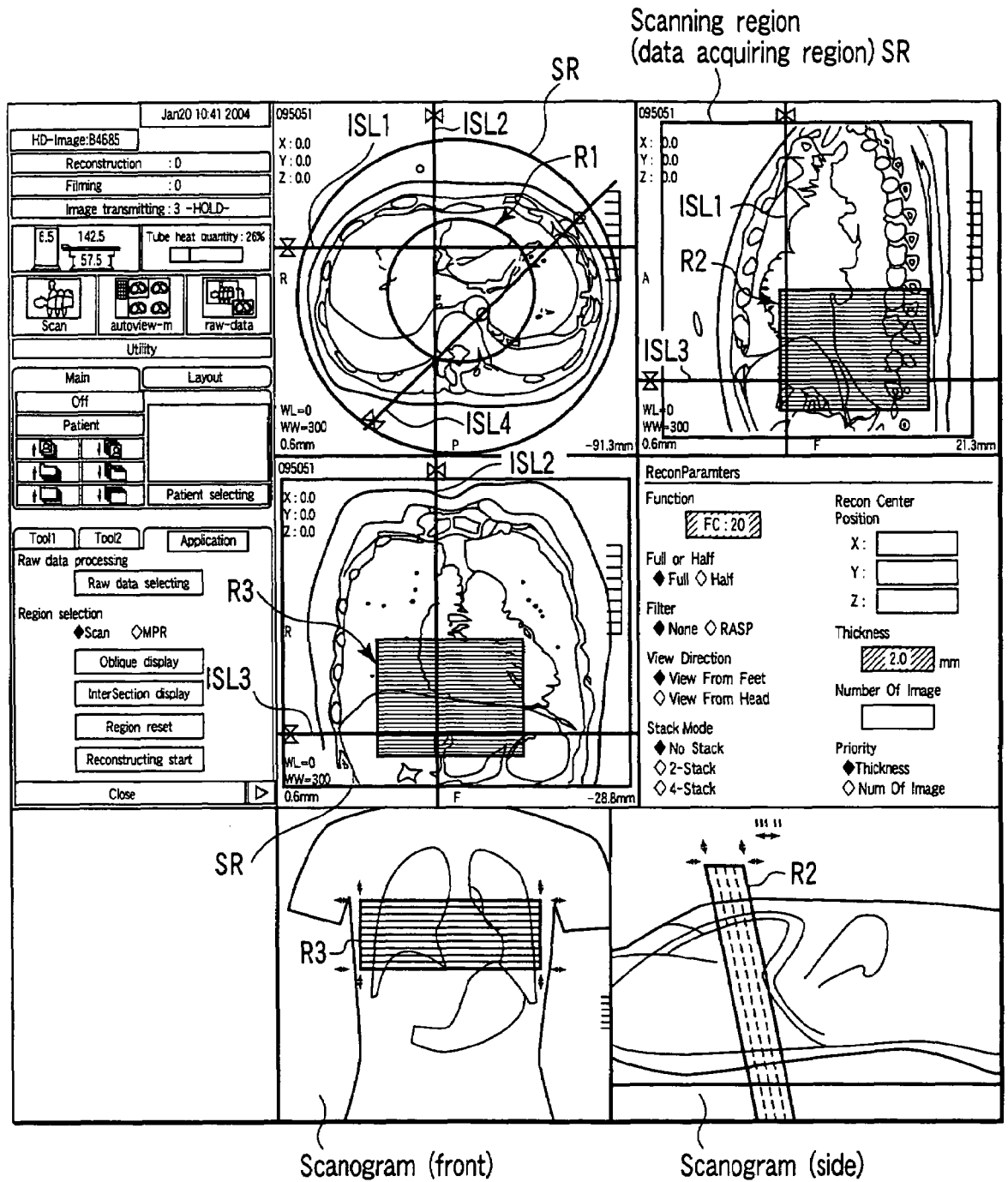
FIG. 7 is a view showing another example of the display screen in S12 of FIG. 4.
Figure 8:
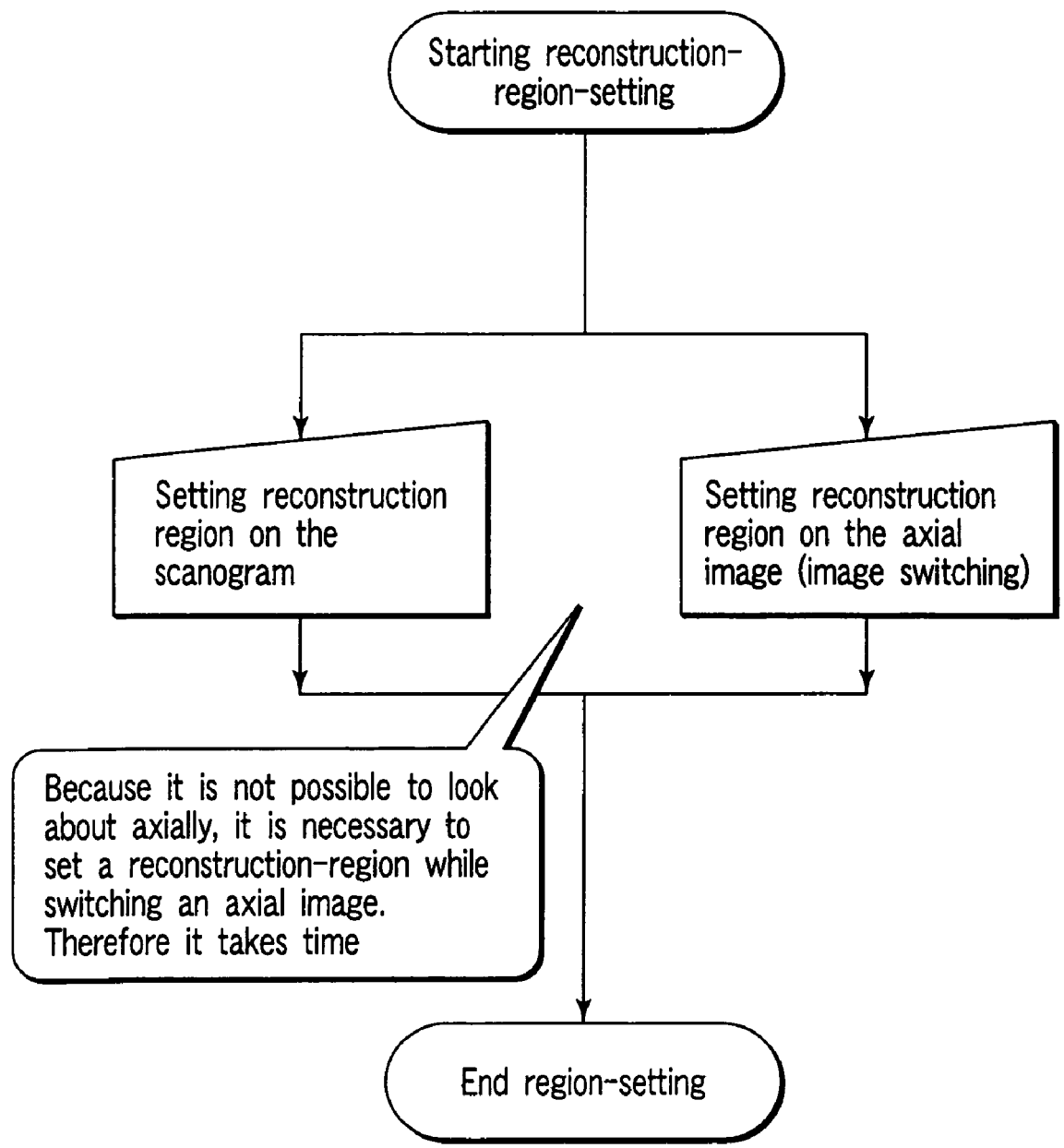
FIG. 8 is a chart showing an outline of processing for setting a zooming reconstruction range in a prior art.

The GUI screen generating unit 26 generates a CUI screen including: the axial image (XY plane), sagittal image (XZ plane), and coronal image (YZ plane) generated in S11, as shown in FIG. 5, under the control of the system control unit 11 together with graphic elements (called marks) R1, R2, and R3 representing a zooming reconstruction range; inter section lines, ISL1, ISL2, and ISL3 representing a slice position mutually; a frame SR representing a scan range having projection data acquired therein; and a reconstruction condition in the lower right column of the screen. On the GUI screen, as shown in FIG. 7, a scanogram imaged during scan planning may be displayed together with the marks R2 and R3.

The GUI screen includes scan conditions (upper left column) and icon sets (lower left column). The icon sets include: a "raw data selection" button for selectively instructing which scanning is carried out to acquire raw data (or projection data) and how batch processing (zooming reconstruction processing) is carried out by using the acquired data; an "oblique display" button for instructing generation and display of a slice image (oblique image) of a slice plane which is oblique along any of at least X axis, Y, axis, and Z axis corresponding to an inter section line ISL4; an Inter Section display" button for selectively instructing display/non-display of the inter section lines ISL1 to 4; a "range reset" button for resetting a zooming reconstruction range; and a "reconstruction execution" button for starting execution of reconstruction. The generated GUI screen is displayed on the monitor 28.

In order to set the zooming reconstruction range, a slice plane of each of the axial image, sagittal image, and coronal image can be moved by moving each of the corresponding inter section lines ISL3, ISL2, and ISL1 (S13). Movement of the inter section lines ISL3, ISL2, and ISL1 is carried out by an alternate operation between a mouse whirl rotating operation included in the input device 10 and a drag and drop of the inter section lines ISL3, ISL2, and ISL1. In the case of the mouse whirl rotating operation, whirling is rotationally operated in a state in which a pointer is allocated on an image targeted to be moved.

Figure 6:
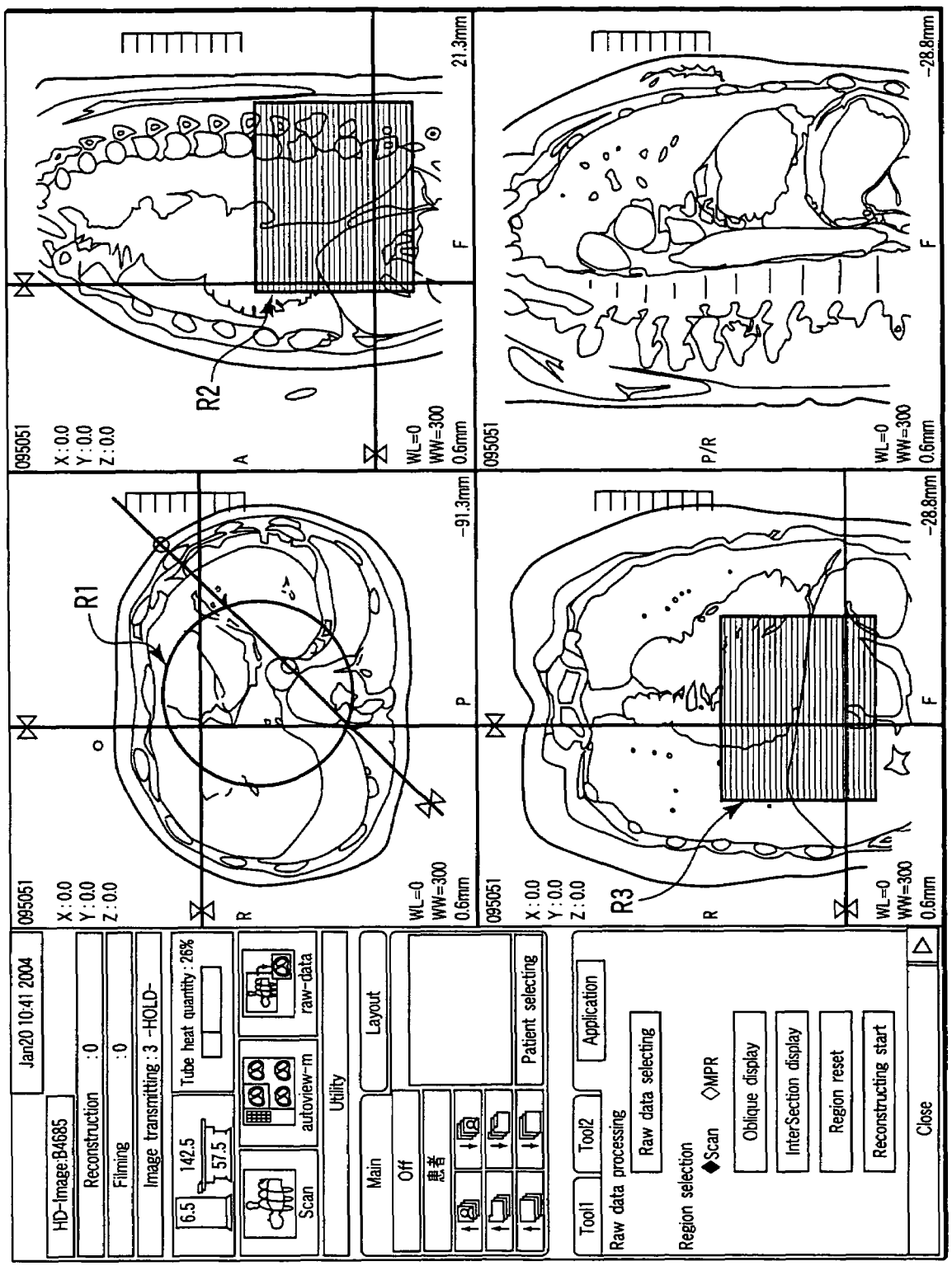
FIG. 6 is a view showing an example of a display screen in S17 of FIG. 4.

When any one of the inter section lines is moved, the slice image according to the slice plane passing through the inter section line ISL1, ISL2, or ISL3 after moved is generated from the volume data, and the generated image is switched and displayed (S4). When the "oblique display" button is clicked (S15), the slice image of the oblique slice plane according to the position and direction of the oblique inter section line ISL4 arbitrarily specified on the axial image, sagittal image, or coronal image is generated from the volume data (S16). As shown in FIG. 6, the above slice image is switched and displayed in the lower right column from the reconstruction conditions (S17).

While operating the mouse to move the slice position of each of the axial image, sagittal image, and coronal image and display an oblique slice image at an arbitrary position and in an arbitrary direction, an operator checks a region of interest for zooming reconstruction on the slice image and zooms, reduces, rotates, and moves the marks R1, R2, and R3 which represent the zooming reconstruction range so as to properly include the region of interest for the zooming reconstruction (S18). Under the control of the system control unit 11, the marks R1, R2, an R3 are zoomed, reduced, rotated, and moved in association with each other.

In addition, the operator operates the mouse to arbitrarily set the reconstruction conditions for the zooming reconstruction processing, including: a reconstruction function of the zooming reconstruction range, selection of full reconstruction/half reconstruction, reconstruction slice thickness, a viewing direction, the number of stacks, and the presence or absence of filter (S19). The reconstruction conditions for the zooming reconstruction processing are not affected by a limitation of the volume data reconstruction condition. The reconstruction conditions for the zooming reconstruction processing may be identical to the volume data reconstruction conditions or may be partially or entirely different therefrom.

When the zooming reconstruction range and the associated reconstruction conditions are set, the set zooming reconstruction range and reconstruction conditions are transmitted from the system control unit 11 to the reconstruction processing control unit 23 in response to a click of the "reconstruction execution" button (S21). The reconstruction processing control unit 23 controls the reconstruction processing unit 21 so that the tomographic image data corresponding to the transmitted zooming reconstruction range and reconstruction conditions is reconstructed from the projection data stored in the projection data storing unit 20. The zooming reconstructed tomographic image has a 512×512 pixel size equal to a slice image, for example.

In the foregoing, although the tomographic image has been reconstructed by limiting it to the zooming reconstruction range, the whole scan range is reconstructed in accordance with specific items such as a reconstruction function included in the reconstruction conditions of S21, thereby generating volume data, so that a tomographic image in the zooming reconstruction range may be generated from the volume data by means of MPR.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An X-ray computed tomographic apparatus, comprising:
   a scanning unit configured to scan in a three-dimensional region of a subject by X-rays resulting in projection data;
   a storing unit configured to store the projection data;
   a volume data generating unit configured to generate volume data corresponding to the three-dimensional region based on the stored projection data;
   a slice image data generating unit configured to generate, from the volume data, slice image data relating to each of an axial slice plane, a sagittal slice plane, and a coronal slice plane of the three-dimensional region;
   a display control unit configured to cause a display to display an axial slice plane image including a two-dimensional overlaid axial graphic element representing an initial axial zooming reconstruction range, a sagittal slice plane image including a two-dimensional overlaid sagittal graphic element representing an initial sagittal zooming reconstruction range, and a coronal slice plane image including a two-dimensional overlaid coronal graphic element representing an initial coronal zooming reconstruction range, the initial axial, sagittal, and coronal zooming reconstruction ranges combining to form an initial zooming reconstruction range;
   an operating unit operable to enlarge, reduce, and move one of the two-dimensional overlaid axial graphic element, the two-dimensional overlaid sagittal graphic element, and the two-dimensional overlaid coronal graphic element resulting in a final zooming reconstruction range, wherein the final zooming reconstruction range is a three-dimensional region defined by the axial graphic element, the sagittal graphic element, and the coronal graphic element; and
   a reconstructing unit configured to reconstruct tomographic image data that corresponds to the three-dimensional region of the final zooming reconstruction range defined by the graphic elements and that has a resolution higher than the volume data, by reconstructing the stored projection data.

2. An X-ray computed tomographic apparatus according to claim 1, wherein the one or more slice lines include a sagittal slice line, a coronal slice line, and an axial slice lines,
   the axial slice plane image includes the sagittal slice line and the coronal slice line,
   the sagittal slice plane image includes the axial slice line and the coronal slice line, and
   the coronal slice plane image includes the axial slice line and the coronal slice line.

3. An X-ray computed tomographic apparatus according to claim 2, wherein the operating unit is configured to move
   the axial slice plane image by moving the axial slice line on one of the sagittal slice plane image and the coronal slice plane image,
   the sagittal slice plane image by moving the sagittal slice line on one of the axial slice plane image and the coronal slice plane image, and
   the coronal slice plane image by moving the coronal slice line on one of the axial slice plane image and the sagittal slice plane image.

4. An X-ray computed tomographic apparatus according to claim 3, wherein the operating unit includes a whirl mouse configured to move one of the axial slice line, the sagittal slice line, and the coronal slice line.

5. An X-ray computed tomographic apparatus according to claim 2, wherein one of the axial slice plane image, the sagittal slice plane image and the coronal slice plane image includes an oblique slice line.

6. An X-ray computed tomographic apparatus according to claim 5, wherein the displaying unit is configured to display an oblique slice plane image when displaying the axial slice plane image, the sagittal slice plane image, and the coronal slice plane image.

7. An X-ray computed tomographic apparatus according to claim 1, wherein one of the two-dimensional overlaid axial graphic element, two-dimensional overlaid sagittal graphic element, and the two-dimensional overlaid coronal graphic element has a rectangular shape.

8. An X-ray computed tomographic apparatus according to claim 1, wherein
the volume data generating unit is configured to generate the volume data in accordance with a volume image data reconstruction condition and the reconstruction unit is configured to reconstruct the tomographic image data in accordance with a tomographic image data reconstruction condition set separately from the volume image data reconstruction condition.

9. An X-ray computed tomographic apparatus according to claim 8, wherein
the tomographic image data reconstruction condition is different from the volume image data reconstruction condition.

10. The X-ray computed tomographic apparatus according to claim 1, wherein the reconstructing unit is configured to reconstruct the tomographic image data based on a zooming reconstruction criterion including one of:
a selection of a full or a half reconstruction,
a reconstruction slice thickness,
a viewing direction,
a number of stacks, and
a presence or absence of a filter.

11. An X-ray computed tomographic apparatus, comprising:
a scanning unit configured to perform scanning in a three-dimensional region of a subject by means of X rays to generate projection data;
a storing unit configured to store the projection data;
a display control unit configured to cause a display to display
an axial slice plane image of the three-dimensional region including a two-dimensional overlaid axial graphic element representing an initial axial zooming reconstruction range, a sagittal slice plane image of the three-dimensional region including a two-dimensional overlaid sagittal graphic element representing an initial sagittal zooming reconstruction range, and a coronal slice plane image of the three-dimensional region including a two-dimensional overlaid coronal graphic element representing an initial coronal zooming reconstruction range, the initial axial, sagittal and coronal zooming reconstruction ranges combining to form an initial zooming reconstruction range;
an operating unit operable to enlarge, reduce and move one of the two-dimensional overlaid axial graphic element, the two-dimensional overlaid sagittal graphic element, and the two-dimensional overlaid coronal graphic element resulting in a final zooming reconstruction range, wherein the final zooming reconstruction range is a three-dimensional region defined by the axial graphic element, the sagittal graphic element, and the coronal graphic element; and
a reconstructing unit configured to reconstruct tomographic image data that corresponds to the three-dimensional region of the final zooming reconstruction range represented by the graphic elements and that has a resolution higher than volume data of the three dimensional region generated based on the stored projection data, by reconstructing the stored projection data.

12. The X-ray computed tomographic apparatus of claim 11, wherein
the display control unit is configured to cause the display to display a scanogram relating to the subject together with a two-dimensional scanogram graphic element overlaid on the scanogram representing the initial zooming reconstruction range.

13. An image processing apparatus, comprising:
a storing unit configured to store projection data relating to a three-dimensional region of a subject;
a volume data generating unit configured to generate volume data corresponding to the three-dimensional region, based on the stored projection data;
a slice image data generating unit configured to generate, from the volume data, slice image data relating to each of an axial slice plane, a sagittal slice plane, and a coronal slice plane;
a display control unit configured to cause a display to display an axial slice plane image including a two-dimensional overlaid axial graphic element representing an initial axial zooming reconstruction range, a sagittal slice plane image including a two-dimensional overlaid sagittal graphic element representing an initial sagittal zooming reconstruction range, and a coronal slice plane image including a two-dimensional overlaid coronal graphic element representing an initial coronal zooming reconstruction range, the initial axial, sagittal and coronal zooming reconstruction ranges combining to form an initial zooming reconstruction range;
an operating unit operable to enlarge, reduce, and move one of the two-dimensional overlaid axial graphic element, the two-dimensional overlaid sagittal graphic element, and the two-dimensional overlaid coronal graphic element resulting in a final zooming reconstruction range, wherein the final zooming reconstruction range is a three-dimensional region defined by the axial graphic element, the sagittal graphic element, and the coronal graphic element; and
a reconstructing unit configured to reconstruct tomographic image data that corresponds to the three-dimensional region of the final zooming reconstruction range represented by the graphic elements and that has a resolution higher than the volume data, by reconstructing the stored projection data.

14. An image processing apparatus, comprising:
a storing unit configured to store projection data relating to a three-dimensional region of a subject;
a display control unit configured to cause a display to display an axial slice plane image of the three-dimensional region including a two-dimensional overlaid axial graphic element representing an initial axial zooming reconstruction range, a sagittal slice plane image of the three-dimensional region including a two-dimensional overlaid sagittal graphic element representing an initial sagittal zooming reconstruction range, and a coronal slice plane image of the three-dimensional region including a two-dimensional overlaid coronal graphic element representing an initial coronal zooming reconstruction range, the initial axial, sagittal and coronal zooming reconstruction ranges combining to form an initial zooming reconstruction range;

an operating unit operable to enlarge, reduce and move one of the two-dimensional overlaid axial graphic element, the two-dimensional overlaid sagittal graphic element, and the two-dimensional overlaid coronal graphic element resulting in a final zooming reconstruction range, wherein the final zooming reconstruction range is a three-dimensional region defined by the axial graphic element, the sagittal graphic element, and the coronal graphic element; and a reconstructing unit configured to reconstruct tomographic image data that corresponds to the three-dimensional region of the final zooming reconstruction range represented by the graphic elements and that has a resolution higher than volume data of the three-dimensional region generated based on the stored projection data, by reconstructing the stored projection data.

15. The image processing apparatus of claim 14, wherein the display control unit is configured to cause the display to display a scanogram relating to the subject together with a two-dimensional scanogram graphic element overlaid on the scanogram representing the initial zooming reconstruction range.

16. An X-ray computed tomographic method, comprising:

scanning in a three-dimensional region of a subject by X-rays resulting in projection data;

storing the projection data;

generating volume data corresponding to the three-dimensional region based on the stored projection data;

generating, from the volume data, slice image data relating to each of an axial slice plane, a sagittal slice plane, and a coronal slice plane of the three-dimensional region;

driving a display to display an axial slice plane image including a two-dimensional overlaid axial graphic element representing an initial axial zooming reconstruction range, a sagittal slice plane image including a two-dimensional overlaid sagittal graphic element representing an initial sagittal zooming reconstruction range, and a coronal slice plane image including a two-dimensional overlaid coronal graphic element representing an initial coronal zooming reconstruction range, the initial axial, sagittal and coronal zooming reconstruction ranges combining to form an initial zooming reconstruction range;

one of enlarging, reducing, and moving one of the two-dimensional overlaid axial graphic element, the two-dimensional overlaid sagittal graphic element, and the two-dimensional overlaid coronal graphic element resulting in a final zooming reconstruction range, wherein the final zooming reconstruction range is a three-dimensional region defined by the axial graphic element, the sagittal graphic element, and the coronal graphic element; and reconstructing tomographic image data that corresponds to the three-dimensional region of the final zooming reconstruction range represented by the graphic elements and that has a resolution higher than the volume data, by reconstructing the stored projection data.

17. The X-ray computed tomographic method according to claim 16, wherein the step of reconstructing tomographic image data includes reconstructing tomographic image data based on a zooming reconstruction criterion including one of:

a selection of a full or a half reconstruction, a reconstruction slice thickness, a viewing direction, a number of stacks, and a presence or absence of a filter.

18. An X-ray computed tomographic method, comprising:

scanning in a three-dimensional region of a subject by means of X rays to obtain projection data;

storing the projection data;

driving a display to display an axial slice plane image of the three-dimensional region including a two-dimensional overlaid axial graphic element representing an initial axial zooming reconstruction range, a sagittal slice plane image of the three-dimensional region including a two-dimensional overlaid sagittal graphic element representing an initial sagittal zooming reconstruction range, and a coronal slice plane image of the three-dimensional region including a two-dimensional overlaid coronal graphic element representing an initial coronal zooming reconstruction range, the initial axial, sagittal and coronal zooming reconstruction ranges combining to form an initial zooming reconstruction range;

one of enlarging, reducing, and moving one of the two-dimensional overlaid axial graphic element, the two-dimensional overlaid sagittal graphic element, and the two-dimensional overlaid coronal graphic element resulting in a final zooming reconstruction range, wherein the final zooming reconstruction range is a three-dimensional region defined by the axial graphic element, the sagittal graphic element, and the coronal graphic element; and reconstructing tomographic image data that corresponds to the three-dimensional region of the final zooming reconstruction range represented by the graphic elements and that has a resolution higher than volume data of the three-dimensional region generated based on the stored projection data, by reconstructing the stored projection data.

19. The X-ray computed tomographic method of claim 18, further comprising:

driving the display to display a scanogram relating to the subject together with a two-dimensional scanogram graphic element overlaid on the scanogram representing the initial zooming reconstruction range.

20. An image processing method, comprising:

storing projection data relating to a three-dimensional region of a subject;

generating volume data corresponding to the three-dimensional region, based on the stored projection data;

generating slice image data, from the volume data, slice image data relating to each of an axial slice plane, a sagittal slice plane, and a coronal slice plane of the three-dimensional region;

driving a display to display an axial slice plane image of the three-dimensional region including a two-dimensional overlaid axial graphic element representing an initial axial zooming reconstruction range, a sagittal slice plane image of the three-dimensional region including a two-dimensional overlaid sagittal graphic element representing an initial sagittal zooming reconstruction range, and a coronal slice plane image of the three-dimensional region including a two-dimensional overlaid coronal graphic element representing an initial coronal zooming reconstruction range, the initial axial, sagittal and coronal zooming reconstruction ranges combining to form an initial zooming reconstruction range;

one of enlarging, reducing, and moving one of the two-dimensional overlaid axial graphic element, the two-dimensional overlaid sagittal graphic element, and the two-dimensional overlaid coronal graphic element resulting in a final zooming reconstruction range, wherein the final zooming reconstruction range is a three-dimensional region defined by the axial graphic element, the sagittal graphic element and the coronal graphic element; and reconstructing tomographic image data that corresponds to the three-dimensional region of the final zooming reconstruction range represented by the graphic elements and that has a resolution higher than the volume data, by reconstructing the stored projection data.

21. An image processing method, comprising:

storing projection data relating to a three-dimensional region of a subject;

driving a display to display an axial slice plane image of the three-dimensional region including a two-dimensional overlaid axial graphic element representing an initial axial zooming reconstruction range, a sagittal slice plane image of the three-dimensional region including a two-dimensional overlaid sagittal graphic element representing an initial sagittal zooming reconstruction range, and a coronal slice plane image of the three-dimensional region including a two-dimensional overlaid coronal graphic element representing an initial coronal zooming reconstruction range, the initial axial, sagittal and coronal zooming reconstruction ranges combining to form an initial zooming reconstruction range;

one of enlarging, reducing, and moving one of the two-dimensional overlaid axial graphic element, the two-dimensional overlaid sagittal graphic element, and the two-dimensional overlaid coronal graphic element resulting in a final zooming reconstruction range, wherein the final zooming reconstruction range is a three-dimensional region defined by the axial graphic element, the sagittal graphic element, and the coronal graphic element; and reconstructing tomographic image data that corresponds to the three-dimensional region of the final zooming reconstruction range represented by the graphic elements and that has a resolution higher than volume data of the three dimensional region generated based on the stored projection data, by reconstructing the stored projection data.

22. The image processing method of claim 21, further comprising:

driving the display to display a scanogram relating to the subject together with a two-dimensional scanogram graphic element overlaid on the scanogram representing an initial zooming reconstruction range.

* * * * *